(12) United States Patent
Wolschlager et al.

(10) Patent No.: US 8,450,999 B2
(45) Date of Patent: May 28, 2013

(54) ROTARY POSITION SENSOR

(75) Inventors: Kevin C. Wolschlager, Elkhart, IN (US); Robert L. Newman, Edwardsburg, MI (US); Kim D. Cook, Wakarusa, IN (US)

(73) Assignee: CTS Corporation, Elkhart, IN (US)

( * ) Notice: Subject to any disclaimer, the term of this patent is extended or adjusted under 35 U.S.C. 154(b) by 616 days.

(21) Appl. No.: 12/706,026

(22) Filed: Feb. 16, 2010

(65) Prior Publication Data

US 2010/0207616 A1    Aug. 19, 2010

Related U.S. Application Data

(60) Provisional application No. 61/207,755, filed on Feb. 17, 2009.

(51) Int. Cl.
*G01B 7/30*  (2006.01)
(52) U.S. Cl.
USPC .................................................. 324/207.25
(58) Field of Classification Search
USPC .................................................. 324/207.25
See application file for complete search history.

(56) References Cited

U.S. PATENT DOCUMENTS

| | | | |
|---|---|---|---|
| 1,296,650 A | 3/1919 | Graham | |
| 2,935,714 A | 5/1960 | Barden | |
| 3,047,751 A | 7/1962 | Hudson | |
| 3,097,316 A | 7/1963 | Barden | |
| 3,521,095 A | 7/1970 | Russo | |
| 3,610,714 A | 10/1971 | DeGaeta | |
| 3,749,458 A | 7/1973 | Thylefors | |
| 3,784,850 A | 1/1974 | Inaba et al. | |
| 3,847,456 A | 11/1974 | Schwarzbich | |
| 3,971,963 A | 7/1976 | Koike et al. | |
| 4,006,375 A | 2/1977 | Lyman, Jr. et al. | |
| 4,081,204 A | 3/1978 | Bauer et al. | |
| 4,082,971 A | 4/1978 | Miyake et al. | |
| 4,125,821 A | 11/1978 | Masuda | |

(Continued)

FOREIGN PATENT DOCUMENTS

| | | |
|---|---|---|
| DE | 100 01 047 | 7/2001 |
| DE | 20214511 U1 | 3/2004 |

(Continued)

OTHER PUBLICATIONS

Melexis (Microelectronic Integrated Systems) MLX90316 Rotary Position Sensor IC Data Sheet Dated Sep. 20, 2005, pp. 1-34, Melexis NV, Ieper, Belgium.

(Continued)

*Primary Examiner* — Reena Aurora
(74) *Attorney, Agent, or Firm* — Daniel J. Deneufbourg

(57) ABSTRACT

A sensor assembly for sensing a movable object which, in one embodiment, includes a housing defining an interior cavity. A rotor is retained in the cavity. The rotor defines a central bore and a magnet is mounted in an off-center pocket defined by the rotor. The rotor is coupled to the shaft of the movable object whose position is to be measured. A sensor is also retained in the cavity in a relationship at least partially overlying the magnet and adapted to sense at least the direction of the magnetic field generated by the magnet to generate an electrical signal indicative of the position of the movable object. In another embodiment, the rotor and sensor are mounted in separate interior housing cavities separated by an interior housing wall.

11 Claims, 10 Drawing Sheets

U.S. PATENT DOCUMENTS

| | | |
|---|---|---|
| 4,150,314 A | 4/1979 | Zabler et al. |
| 4,228,378 A | 10/1980 | Humbert |
| 4,278,290 A | 7/1981 | Werner |
| 4,334,352 A | 6/1982 | VanBenthuysen |
| 4,355,293 A | 10/1982 | Driscoll |
| 4,430,634 A | 2/1984 | Hufford et al. |
| 4,435,691 A | 3/1984 | Ginn |
| 4,479,107 A | 10/1984 | Bleeke |
| 4,503,417 A | 3/1985 | Bleeke et al. |
| 4,529,933 A | 7/1985 | Bleeke |
| 4,541,744 A | 9/1985 | Lederman |
| 4,575,929 A | 3/1986 | Bleeke |
| 4,588,314 A | 5/1986 | Anscher |
| 4,616,504 A | 10/1986 | Overcash et al. |
| 4,645,430 A | 2/1987 | Carleton |
| 4,652,152 A | 3/1987 | Brandenstein et al. |
| 4,688,420 A | 8/1987 | Minagawa |
| 4,703,649 A | 11/1987 | Eitoku et al. |
| 4,707,645 A | 11/1987 | Miyao et al. |
| 4,708,497 A | 11/1987 | Lederman |
| 4,721,939 A | 1/1988 | Prestel |
| 4,722,617 A | 2/1988 | Stella et al. |
| 4,822,183 A | 4/1989 | Lederman |
| 4,823,038 A | 4/1989 | Mizutani et al. |
| 4,823,040 A | 4/1989 | Oudet |
| 4,854,437 A | 8/1989 | Harrington et al. |
| 4,887,919 A | 12/1989 | Hamblin |
| 4,951,796 A | 8/1990 | Harrington et al. |
| 4,961,342 A | 10/1990 | Matsumoto et al. |
| 4,973,866 A | 11/1990 | Wang |
| 4,985,669 A | 1/1991 | Smith |
| 4,989,451 A | 2/1991 | Ogawa et al. |
| 5,012,673 A | 5/1991 | Takano et al. |
| 5,023,599 A | 6/1991 | Mitchell et al. |
| 5,039,975 A | 8/1991 | Ishihara |
| 5,053,661 A | 10/1991 | Kitamura et al. |
| 5,054,940 A | 10/1991 | Momose et al. |
| 5,070,728 A | 12/1991 | Kubota et al. |
| 5,102,241 A | 4/1992 | Pflungner |
| 5,110,221 A | 5/1992 | Narkon et al. |
| 5,120,011 A | 6/1992 | Mintgen et al. |
| 5,133,321 A | 7/1992 | Hering et al. |
| 5,184,040 A | 2/1993 | Lim |
| 5,271,269 A | 12/1993 | Rilling et al. |
| 5,298,825 A | 3/1994 | Oudet et al. |
| 5,309,134 A | 5/1994 | Ridge |
| 5,321,980 A | 6/1994 | Hering et al. |
| 5,331,237 A | 7/1994 | Ichimura |
| 5,332,965 A | 7/1994 | Wolf et al. |
| 5,334,893 A | 8/1994 | Oudet et al. |
| 5,376,914 A | 12/1994 | Matsui et al. |
| 5,385,068 A | 1/1995 | White et al. |
| 5,415,144 A | 5/1995 | Hardin et al. |
| 5,416,295 A | 5/1995 | White et al. |
| 5,417,500 A | 5/1995 | Martinie |
| 5,426,995 A | 6/1995 | Maennle |
| 5,460,035 A | 10/1995 | Pfaffenberger |
| 5,512,871 A | 4/1996 | Oudet et al. |
| 5,520,044 A | 5/1996 | Pfaffenberger |
| 5,528,139 A | 6/1996 | Oudet et al. |
| 5,531,525 A | 7/1996 | Hida et al. |
| 5,539,373 A | 7/1996 | Pfaffenberger et al. |
| 5,586,827 A | 12/1996 | Unno et al. |
| 5,590,632 A | 1/1997 | Kato et al. |
| 5,613,571 A | 3/1997 | Rank et al. |
| 5,637,937 A | 6/1997 | Nakajima |
| 5,661,890 A | 9/1997 | Pfaffenberger |
| 5,672,818 A | 9/1997 | Schaefer et al. |
| 5,684,407 A | 11/1997 | Zdanys, Jr. et al. |
| 5,698,778 A | 12/1997 | Ban et al. |
| 5,712,561 A | 1/1998 | McCurley et al. |
| 5,757,179 A | 5/1998 | McCurley et al. |
| 5,770,900 A | 6/1998 | Sato et al. |
| 5,798,639 A | 8/1998 | McCurley et al. |
| 5,810,484 A | 9/1998 | Bustamante et al. |
| 5,811,968 A | 9/1998 | Nakazawa et al. |
| 5,814,914 A | 9/1998 | Caamano |
| 5,828,151 A | 10/1998 | Bustamante et al. |
| 5,828,290 A | 10/1998 | Buss et al. |
| 5,831,356 A | 11/1998 | Aoshima |
| 5,889,400 A | 3/1999 | Nakazawa |
| 5,905,198 A | 5/1999 | Pfaffenberger |
| 5,955,881 A | 9/1999 | White et al. |
| 5,963,124 A | 10/1999 | Buss et al. |
| 5,982,058 A | 11/1999 | Bustamante et al. |
| 5,982,170 A | 11/1999 | McCurley et al. |
| 5,998,892 A | 12/1999 | Smith et al. |
| 6,018,241 A | 1/2000 | White et al. |
| 6,018,992 A | 2/2000 | Kaijala |
| 6,031,448 A | 2/2000 | Starkweather et al. |
| 6,037,696 A | 3/2000 | Sromin et al. |
| 6,040,756 A | 3/2000 | Kaijala |
| 6,043,645 A | 3/2000 | Oudet et al. |
| 6,057,682 A | 5/2000 | McCurley et al. |
| 6,124,709 A | 9/2000 | Allwine |
| 6,134,888 A | 10/2000 | Zimmer et al. |
| 6,175,233 B1 | 1/2001 | McCurley et al. |
| 6,179,268 B1 | 1/2001 | Seid |
| 6,188,216 B1 | 2/2001 | Fromer |
| 6,198,182 B1 | 3/2001 | Bustamante et al. |
| 6,211,668 B1 | 4/2001 | Duesler et al. |
| 6,222,359 B1 | 4/2001 | Duesler et al. |
| 6,288,534 B1 | 9/2001 | Starkweather et al. |
| 6,304,078 B1 | 10/2001 | Jarrard et al. |
| 6,323,641 B1 | 11/2001 | Allwine |
| 6,323,643 B1 | 11/2001 | Kordecki |
| 6,367,337 B1 | 4/2002 | Schlabach |
| 6,472,865 B1 * | 10/2002 | Tola et al. ............... 324/207.2 |
| 6,515,472 B2 | 2/2003 | Wurn et al. |
| 6,563,305 B1 | 5/2003 | Sorsa et al. |
| 6,639,508 B1 | 10/2003 | Martin |
| 6,992,478 B2 | 1/2006 | Etherington et al. |
| 7,009,387 B2 | 3/2006 | Guderzo |
| 7,088,096 B2 | 8/2006 | Etherington et al. |
| 7,301,328 B2 | 11/2007 | Babin |
| 7,378,842 B2 | 5/2008 | Babin |
| 7,439,732 B2 | 10/2008 | LaPlaca |
| 7,750,625 B2 | 7/2010 | Wolschlager et al. |
| 2002/0067160 A1 | 6/2002 | Oomkes |
| 2003/0173954 A1 | 9/2003 | Terui et al. |
| 2004/0032251 A1 | 2/2004 | Zimmerman et al. |
| 2006/0017430 A1 | 1/2006 | Hagan |
| 2006/0273784 A1 | 12/2006 | Godoy et al. |
| 2007/0008063 A1 | 1/2007 | Lawrence et al. |
| 2008/0218158 A1 | 9/2008 | Carlson et al. |

FOREIGN PATENT DOCUMENTS

| | | |
|---|---|---|
| DE | 10 2005 013 442 | 9/2006 |
| EP | 1 345 005 | 9/2003 |
| FR | 2 898 189 | 7/2007 |
| GB | 2062875 | 5/1981 |
| JP | 56072311 | 6/1981 |
| JP | 08241806 | 9/1996 |

OTHER PUBLICATIONS

Dr. Didier Frachon, Dr.-Ing. Gerald Masson, Thierry Dorge, Dipl.-Ing. Michael Delbaere, Dr.-Ing. Stephan Biwersi, Absolute Magnetic Sensors for Large Diameter Through-Shaft Applications, pp. 1-5, Moving Magnet Technologies SA., 1 Rue Christiaan Huygens, 25000 Besancon, France.

\* cited by examiner

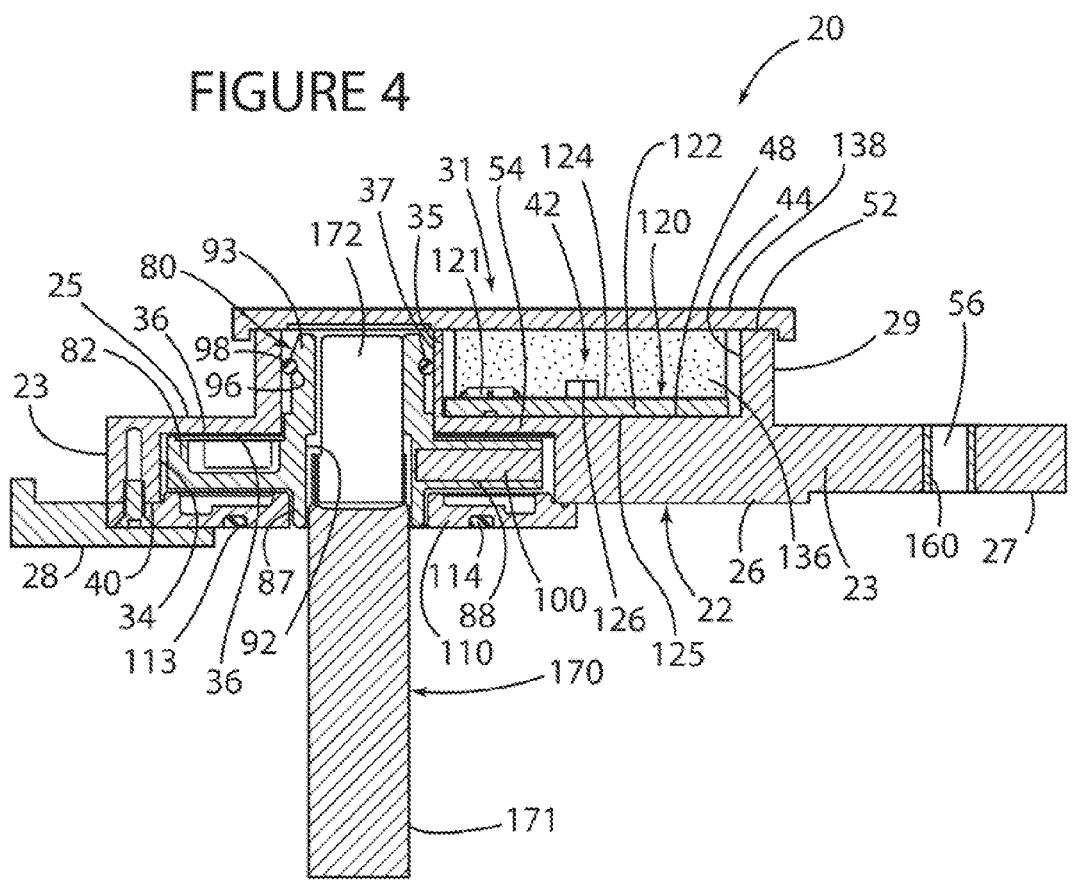

ROTARY POSITION SENSOR

CROSS-REFERENCE TO RELATED APPLICATION

This application claims the benefit of the filing date and disclosure of U.S. Provisional Application Ser. No. 61/207,755 filed on Feb. 17, 2009 which is explicitly incorporated herein by reference as are all references cited therein.

TECHNICAL FIELD

This invention relates in general to position sensors and, more particularly, to a sensor that uses a Hall effect device to generate signal indicating positional information.

BACKGROUND OF THE INVENTION

Position sensors are used to electronically monitor the position or movement of a mechanical component. The position sensor produces an electrical signal that varies as the position of the component in question varies. Electrical position sensors are included in many products. For example, position sensors allow the status of various automotive components to be monitored and controlled electronically.

A position sensor needs to be accurate, in that it must give an appropriate electrical signal based upon the position measured. If inaccurate, a position sensor could potentially hinder the proper evaluation and control of the position of the component being monitored.

It is also typically required that a position sensor be adequately precise in its measurement. However, the precision needed in measuring a position will obviously vary depending upon the particular circumstances of use. For some purposes, only a rough indication of position is necessary; for instance, an indication of whether a valve is mostly open or mostly closed. In other applications, more precise indication of position may be needed.

A position sensor should also be sufficiently durable for the environment in which it is placed. For example, a position sensor used on an automotive valve may experience almost constant movement while the automobile is in operation. Such a position sensor should be constructed of mechanical and electrical components sufficient to allow the sensor to remain accurate and precise during its projected lifetime, despite considerable mechanical vibrations and thermal extremes and gradients.

In the past, position sensors were typically of the "contact" variety. A contacting position sensor requires physical contact to produce the electrical signal. Contacting position sensors typically consist of potentiometers which produce electrical signals that vary as a function of the component's position. Contacting position sensors are generally accurate and precise. Unfortunately, the wear due to contact during movement of contacting position sensors has limited their durability. Also, the friction resulting from the contact can degrade the operation of the component. Further, water intrusion into a potentiometric sensor can disable the sensor.

One important advancement in sensor technology has been the development of non-contacting position sensors. A non-contacting position sensor ("NPS") does not require physical contact between the signal generator and the sensing element. Instead, an NPS utilizes magnets to generate magnetic fields that vary as a function of position, and devices to detect varying magnetic fields to measure the position of the component to be monitored. Often, a Hall effect device is used to produce an electrical signal that is dependent upon the magnitude and polarity of the magnetic flux incident upon the device. The Hall effect device may be physically attached to the component to be monitored and thus moves relative to the stationary magnets as the component moves. Conversely, the Hall effect device may be stationary with the magnets affixed to the component to be monitored. In either case, the position of the component to be monitored can be determined by the electrical signal produced by the Hall effect device.

The use of an NPS presents several distinct advantages over the use of a contacting position sensor. Because an NPS does not require physical contact between the signal generator and the sensing element, there is less physical wear during operation, resulting in greater durability of the sensor. The use of an NPS is also advantageous because the lack of any physical contact between the items being monitored and the sensor itself results in reduced drag.

While the use of an NPS presents several advantages, there are also several disadvantages that must be overcome in order for an NPS to be a satisfactory position sensor for many applications. Magnetic irregularities or imperfections can compromise the precision and accuracy of an NPS. The accuracy and precision of an NPS can also be affected by the numerous mechanical vibrations and perturbations likely to be experienced by the sensor. Because there is no physical contact between the item to be monitored and the sensor, it is possible for them to be knocked out of alignment by such vibrations and perturbations. A misalignment can result in the measured magnetic field at any particular location not being what it would be in the original alignment. Because the measured magnetic field can be different than the measured magnetic field when properly aligned, the perceived position can be inaccurate. Linearity of magnetic field strength and the resulting signal is also a concern.

Devices of the prior art also require special electronics to account for changes in the magnetic field with temperature. The field generated by a magnet changes with temperature and the sensor must be able to differentiate between changes in temperature and changes in position.

SUMMARY OF THE INVENTION

It is a feature of the present invention to provide a sensor assembly for sensing the position of a movable object coupled to a shaft which, in one embodiment, comprises a magnet coupled to the shaft of the movable object in an off-center relationship. The shaft and the magnet are adapted for rotation and the magnet is adapted to generate a magnetic flux field having a direction which is normal with at least one of the surfaces of the magnet. A sensor is retained in the housing in proximity to the magnet. The magnet and the sensor are movable relative to each other and the sensor is adapted to sense the direction of the flux field and generate an electrical signal that is indicative of the direction of the flux field, the position of the shaft, and the position of the movable object coupled to the shaft.

In one embodiment, the sensor assembly comprises a housing and a rotor in the housing defines a bore adapted to receive the shaft of the movable object. The magnet is located in a pocket in the rotor.

In one embodiment, the rotor includes a collar and the pocket is offset from the collar. The rotor and the sensor are located in the housing in at least a partially overlying relationship. In one embodiment, the collar of the rotor is seated against a collar formed in the housing.

In one embodiment, the rotor includes a housing which at least partially surrounds the collar, defines the pocket for the magnet, and defines at least one slot which divides the housing into first and second portions wherein the second portion is adapted to flex independently of the first portion in response to a change in temperature.

In another embodiment, the housing defines first and second cavities separated by an interior wall and the rotor and the sensor are located in the first and second cavities respectively in at least a partially overlying and spaced relationship. First and second plates cover the first and second cavities respectively.

In one embodiment, the shaft extends into the housing and into the bore and collar of the rotor.

In one embodiment, the magnet is semi-circularly shaped, includes a straight surface, and the direction of the magnetic field is generally normal with the straight surface of the magnet.

There are other advantages and features of this invention, which will be more readily apparent from the following detailed description of one embodiment of the invention, the drawings, and the appended claims.

BRIEF DESCRIPTION OF THE DRAWINGS

In the accompanying drawings that form part of the specification, and in which like numerals are employed to designate like parts throughout the same:

FIG. 4 is a simplified horizontal cross-sectional view of the rotary position sensor of the present invention taken along the line 4-4 in FIG. 1;

DETAILED DESCRIPTION OF THE EMBODIMENTS

Figure 1:
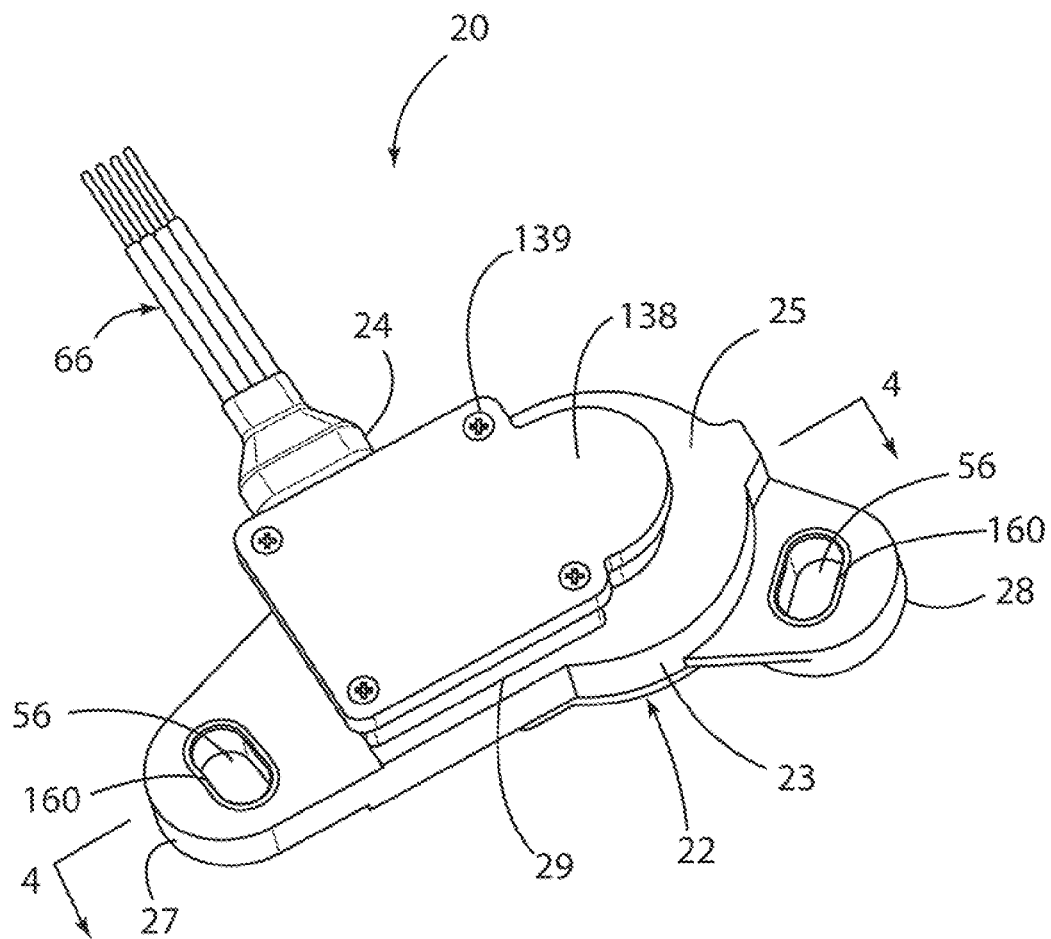
FIG. 1 is a top perspective view of a rotary position sensor in accordance with the present invention.
Figure 2:
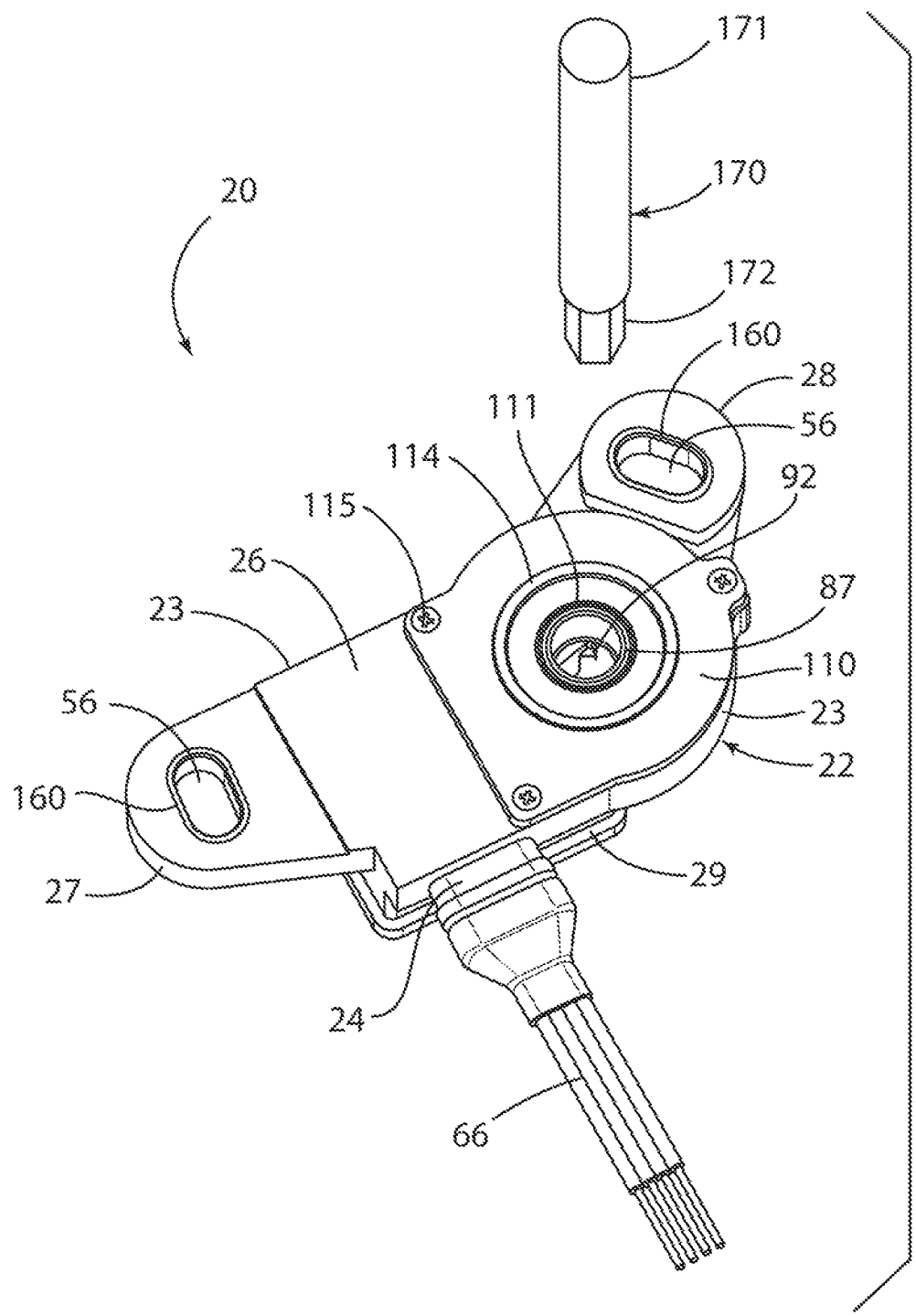
FIG. 2 is a bottom perspective view of the rotary position sensor of FIG. 1 with a shaft of the component whose rotary position is to be measured shown in exploded form.
Figure 3:
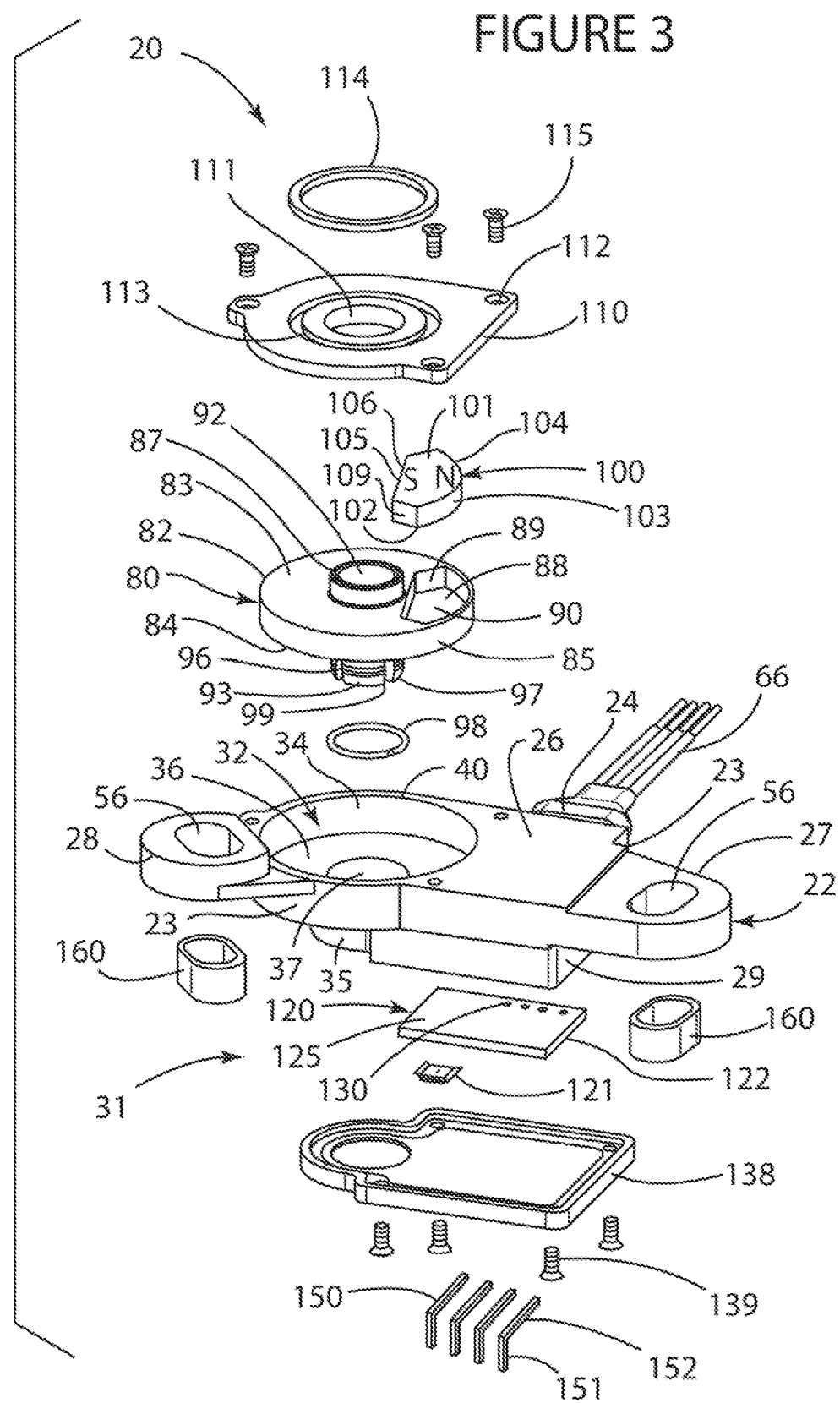
FIG. 3 is an exploded simplified perspective view of the rotary position sensor of FIGS. 1 and 2.

A first embodiment of a rotary position sensor assembly 20 according to the present invention is shown in FIGS. 1-4 which comprises, among other elements, a housing 22, a rotor 80, a magnet 100 (FIG. 3), and a circuit board sensor assembly 120 (FIGS. 3 and 4).

Housing 22 includes opposed top and bottom surfaces 25 and 26 respectively and defines a generally circular base or rotor portion 23 and a generally square sensor portion 29 unitary with and adjacent to the base or rotor portion 23. A connector portion 24 (FIGS. 1 and 2) extends unitarily outwardly from a side of the sensor portion 29. Mounting flanges or brackets 27 and 28 are formed on, and protrude outwardly from, opposing diagonal corners of the housing 22. Bracket 27 protrudes outwardly from a side of sensor portion 29 and bracket 38 protrudes outwardly from a side of rotor portion 23. Housing 22 can be formed from injected molded plastic.

Housing 22 defines two sections, cavities or enclosures. Specifically, base portion 23 of housing 22 defines a rotor cavity 32 (FIG. 3) that houses the rotor 80 and the sensor portion 29 defines a sensor or electronics cavity 42 (FIG. 4) that houses circuit board assembly 120.

Rotor cavity 32 is generally cylindrically-shaped and is located and defined on the side surface 26 of housing 22. Sensor cavity 42 (FIG. 4) is generally square-shaped and is defined in the opposed side surface 25 of housing 22, and thus respective cavities 32 and 42 are positioned in a partially overlapping relationship on opposite sides of the housing 22.

Rotor cavity 32 (FIGS. 3 and 4) is defined by the combination of circular interior vertical peripheral wall 34 and an interior horizontal wall or surface 36. Wall 34 defines an outer peripheral circumferential rim 40 on surface 26. A collar and cylindrical wall 35 defining a central bore or through-hole 37 is defined in and extends from the horizontal surface 36 in the direction of housing surface 25.

Sensor cavity 42 (FIG. 4) is defined by the combination of circumferentially extending interior vertical side wall 44, the collar wall 35, and an interior bottom wall or surface 48 normal to side wall 44.

The side wall 44 defines a circumferential outer rim 52 (FIG. 4) at the top of surface 25. A generally horizontal separation wall 54 (FIG. 4) is formed in the interior of housing 22 and, together with the vertical collar wall 35, separates and isolates the sensor cavity 42 from the rotor cavity 32. Separation wall 54 is unitary with, and oriented substantially normal to, the rotor cavity wall 34 and sensor cavity wall 44. Bottom surface 36 of rotor cavity 32 is located on one side of separation wall 54 and bottom surface 48 of sensor cavity 42 is located on the other side of separation wall 54.

A pair of oval-shaped apertures or through-holes 56 (FIGS. 1-4) are defined in and pass through the respective flanges 27 and 28 of housing 22. Oval-shaped closed metal inserts 160 (FIGS. 1-4) are mounted in apertures 56 by press fitting or the like. A fastener (not shown) is adapted to pass through each of the apertures 56 and inserts 160 to attach housing 22 to another object.

Connector portion or housing 24 (FIG. 2) extends outwardly from one of the sides of sensor housing portion 29. A wire harness 66 is connected to connector portion 24. Terminals 150 (FIG. 3) are adapted to be located within connector portion 24 and mate with wire harness 66. Wire harness 66 electrically connects sensor assembly 20 to another electrical circuit.

A generally circular rotor 80 is shown in FIGS. 2-4 which includes a central plate or disc 82 with an upper horizontal surface 83, a lower horizontal surface 84, and an outer circumferential vertical surface or wall 85 therebetween. Rotor 80 can be formed from injected molded plastic.

A first cylindrical collar 87 extends normally outwardly from the center of upper surface 83 of the disc 82 and defines a central shaft bore or through-hole 92. A second cylindrical collar 93 extends normally outwardly from the center of the lower surface 84 of disc 82. Shaft bore or through-hole 92 extends through the rotor 80 and, more specifically, successively through the collar 87, the disc 82 and the collar 93.

Collar 93 is split into four sections or segments 97 by elongate, generally vertical slots 99. Segments 97 extend circumferentially around wall 93 in a spaced-apart and parallel relationship.

An off-center or off-shaft or off-axis magnet recess or pocket 88 is defined in the disc 82 of rotor 80 by the combination of an interior side wall 89 and a bottom wall 90 which is normal to side wall 89. Magnet pocket 88 is defined on an off-center portion of disc 82 located between the central bore 92 and outer circumferential wall 85. Magnet 100 is received and seated in the pocket 88.

A circumferential recess 96 (FIG. 4) is defined in and located in the outside surface of collar 93. A metal grip ring 98 (FIGS. 3 and 4) surrounds the collar 93 and is seated in recess 96 and adapted to provide a seal between the rotor 80 and the housing collar wall 35 and also to retain rotor 80 in a relationship normal to the housing 22.

The bore 92 of rotor 80 receives the shaft 170 of the object whose rotary position is to be measured. In the embodiment shown, shaft 170 has a mating feature such as, for example, a rectangularly-shaped end 172 (FIG. 2). Shaft 170 also has an opposite cylindrically-shaped end 171. Shaft 170 extends generally normally outwardly from housing 22 and can be attached to any type of object whose rotary position is to be measured.

Rectangular end 172 of shaft 170 extends through the rotor bore 92 and into the interior of collar 93. The compression and flexing of the segments 97 of collar 93 inwardly against the outer surface of the rectangular end 172 of shaft 170 secures the shaft 170 to the rotor 80.

Figures 5A, 5B, 5C:
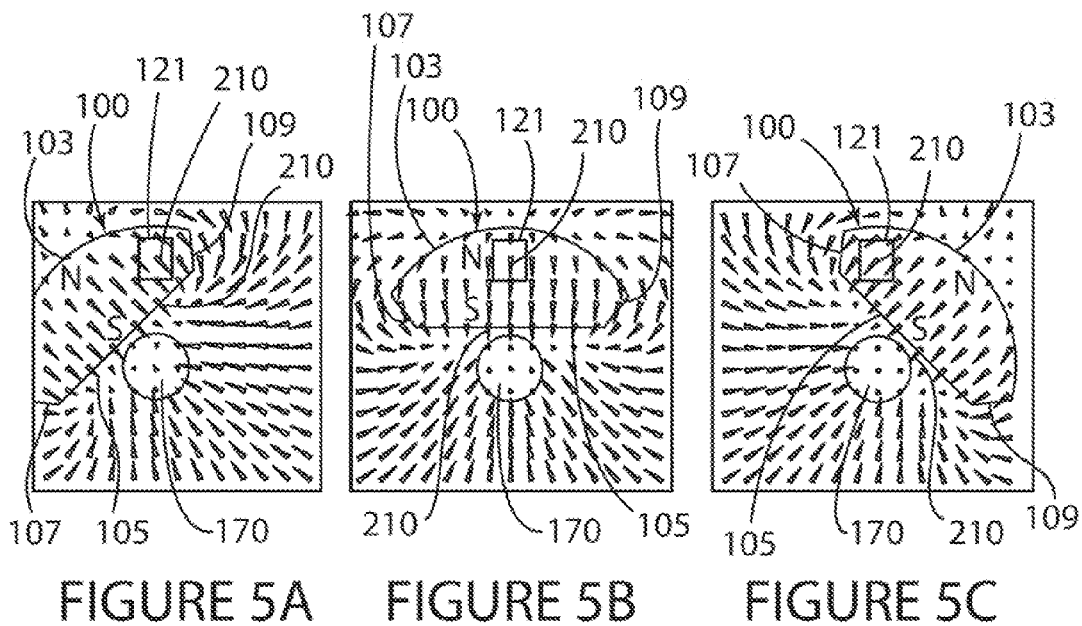
FIGS. 5A-5C are flux diagrams depicting the flux generated by the magnet of the rotary position sensor of the present invention at three different measurement angles/magnet positions.
Figure 6:
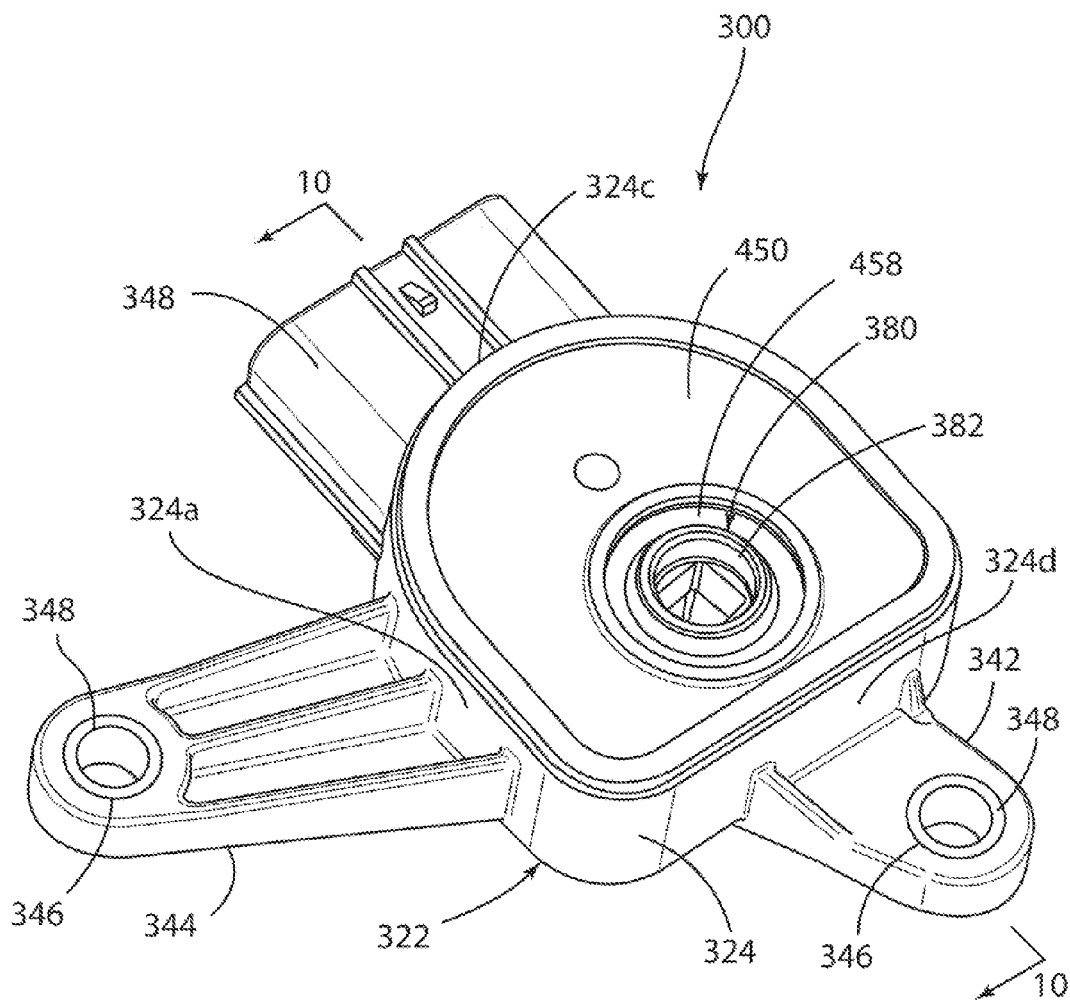
FIG. 6 is a top perspective view of another embodiment of a rotary position sensor in accordance with the present invention.
Figure 7:
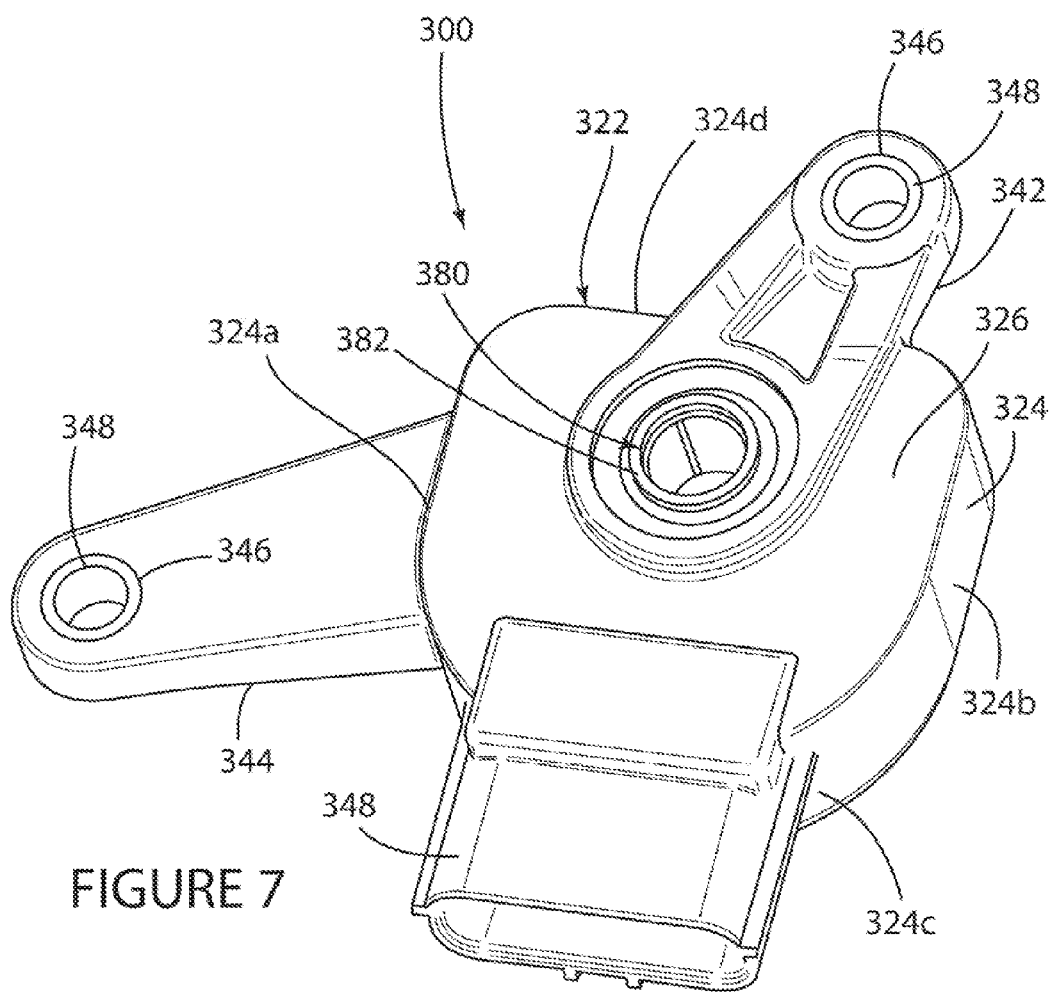
FIG. 7 is a bottom perspective view of the rotary position sensor in FIG. 6.

As shown in FIGS. 3, 4, and 5, the magnet 100 is generally semi-circular or moon-shaped and is adapted to be mounted in pocket 88 defined in the disc 82 of rotor 80 in an off-set or off-axis relationship relative to the bore 92 of rotor 80 and is held in place therein with a heat stake (not shown) or, alternatively, is press fitted therein. In the embodiment shown, the pocket 88 has the same general shape as the magnet 100. Magnet 100 is a permanent magnet that is polarized in a manner wherein it defines a north pole 104 and a south pole 105 (FIGS. 5A-5C). Magnet 100 can be made from several different magnetic materials such as, but not limited to, ferrite or samarium cobalt or neodymium-iron-boron.

Magnet 100 defines a top horizontal surface 101, a bottom horizontal surface 102 spaced from, opposed to, and parallel to the surface 101; a curved semi-circular side vertical surface 103; a straight vertical side surface 106 opposite the semi-circular surface 103; and a pair of opposed end side vertical surfaces 107 and 109 extending between the ends of surfaces 103 and 106.

Rotor 80 is seated and supported in rotor cavity 32 for rotary movement therein in a relationship wherein the collar 93 of rotor 80 extends through the aperture 37 in cavity 32 and into the collar 35 in housing 22 and the disc 82 of rotor 80 is seated in rotor cavity 32. A cover plate 110 (FIGS. 2-4) is mounted over the surface 26 and rim 40 of housing 22, covers the cavity 32, and thus the rotor 80 housed therein. Cover 110 defines a central aperture 111 and peripheral screw apertures 112. An annular slot or recess 113 is defined in cover 110 and surrounds and is spaced from the shaft aperture 111. A ring or face seal 114 is press fit into the slot 113. Fasteners or screws 115 extend through the respective apertures 111 to attach the cover 110 to the housing 22. Face seal 114 forms a seal with another mounting surface (not shown) to which sensor housing 22 is adapted to be mounted. Collar 87 of rotor 80 extends through the aperture 111 in plate 110.

FIGS. 3 and 4 depict a circuit board sensor assembly 120 seated and mounted in sensor cavity 42 defined in housing portion 29 and including a generally rectangular printed circuit board 122 having a top surface 124, a bottom surface 125 abutted against the floor 125 of separation wall 54, and plated through-holes 130 extending between the top and bottom surfaces 124 and 125. Printed circuit board 122 can be a conventional printed circuit board formed from FR4 material.

A sensor 121 such as, for example, a magnetic field sensor, is mounted to top surface 124 by conventional electronic assembly techniques such as, for example, soldering. Magnetic field sensor 121 can be a model number MLX90316 Hall effect integrated circuit from Melexis Corporation of Ieper, Belgium which is adapted to measure both the magnitude and direction of a magnetic field or flux generated by the magnet 100. Other electronic components 126 (FIG. 4) including, for example, capacitors, resistors, inductors, and other types of conditioning, amplifying and filtering devices are mounted to the top surface 124 using conventional electronic assembly techniques.

Sensor 121 is preferably seated on board 120 in cavity 42 in a relationship overlying the magnet 100 in recess 88 of rotor 80 seated in cavity 32.

A potting compound 136 (FIG. 4) such as, for example, a silicone gel is applied over printed circuit board 122, the sensor 121, and the other components 126 on the surface 124 to seal the printed circuit board 122, the sensor 121, and the components 126 from the outside environment.

Several generally L-shaped electrically conductive metal terminals 150 (FIG. 3) also extend through one of the housing walls between the connector 24 at one end and the printed circuit board 122 at the other end. Specifically, terminals 150 defines ends 151 and 152 that are bent at a generally ninety (90) degree angle relative to each other. Although not shown or described in any detail, it is understood that terminal ends 151 are soldered to the respective through-holes 130 in printed circuit board 122 and that the terminal ends 152 extend out of the housing 22 and into connector portion 24 where they are connected to wire harness 66.

Another cover plate 138 (FIGS. 1, 3 and 4) is seated over the rim 52 of housing portion 29 to cover the cavity 42 and printed circuit board 122 therein Cover plate 138 is attached to the rim 52 of housing portion 29 of housing 22 by fasteners or screws 139.

Rotary position sensor assembly 20 is used to ascertain the position of a rotating or movable object such as shaft 170 which, as described above, includes a first end 172 which extends through the aperture 111 in cover plate 110 and through the bore 92 in rotor 80; and an opposite end 171 which is adapted for connection to a wide variety of rotating or moving objects including, for example, a vehicle transmission.

As shown in FIGS. 4 and 5A-5C, when shaft 170 is rotated, rotor 80 and magnet 100 are also rotated relative to the stationary sensor 121 which, as described above, is spaced from and overlies the magnet 100. Interior horizontal housing wall 54 and printed circuit board 122 separate the sensor 121 from the magnet 100. The magnetic flux field generated by the magnet 100 passes through the interior housing wall 54 and printed circuit board 122 and the magnitude/strength and direction/polarity of the magnetic flux field is sensed by the sensor 121. Specifically, it is understood that the magnetic field can vary in magnitude/strength and in polarity/direction depending upon the position of the magnet 100 and the location at which the magnet parameters (lines of flux) are measured.

Sensor 121 produces an electrical output signal that changes in response to the position of magnet 100 and the position of shaft 170. As the magnetic field (i.e., magnitude/ strength and polarity/direction) generated by the magnet 100 varies with rotation of the shaft 170 and rotor 80, the electrical output signal produced by sensor 121 changes accordingly, thus allowing the position of shaft 170 to be determined or ascertained. Sensor 121 senses the changing magnetic field (i.e., magnitude/strength and polarity/direction) as magnet 100 is rotated. In one embodiment, the electrical signal produced by sensor 121 is proportional to the position of shaft 170.

FIGS. 5A-5C depict the location and orientation of the magnetic field/flux lines 210 in a horizontal plane above magnet 100 and passing over and through the magnetic flux sensor 121 at three different shaft and magnet rotation angles or positions, i.e., zero degrees (FIG. 5A), forty-five degrees (FIG. 5B), and ninety degrees (FIG. 5C).

More specifically, magnet 100 generates flux lines 210 that point and flow from the top curved North Pole surface 103 of magnet 100 in the direction of and generally straight through the width of, and opposed bottom straight South Pole surface 105 of, the magnet 100 in an orientation and relationship generally normal to the magnet surface 105.

At the shaft and magnet rotation or position angle of zero degrees (FIG. 5A), the flux lines or vectors 210 have flux directions that point generally diagonally from the top left corner to the bottom right corner of magnetic flux sensor 121, i.e., flux lines or vectors oriented at a forty-five degree angle relative to each of the sensor side faces. Sensor 121 senses this direction of the magnetic field 210 and generates an electrical signal which is representative of the flux direction, the position of the magnet 100, the position of the rotor 80, the position of the shaft 170, and ultimately, the position of the object coupled to the shaft 170.

At a shaft or magnet rotation or position angle of forty-five degrees (FIG. 5B), flux lines or vectors 210 have flux directions that point generally straight across from the top to the bottom of magnetic flux sensor 121, i.e., flux lines or vectors oriented in a relationship parallel to two of the sensor side surfaces and normal to the other two sensor side surfaces. Sensor 121 senses this direction of the magnetic field flux lines 210 and creates an electrical signal representative of the direction and thus the position of the magnet 100 and shaft 170 as described above.

At a shaft or magnet rotation or position angle of ninety degrees (FIG. 5C), flux lines or vectors 210 have flux directions that point generally diagonally from the top right corner to the bottom left corner of magnetic flux sensor 121, i.e., flux lines or vectors oriented at a forty-five degree angle relative to each of the sensor side surfaces. The angular direction and orientation of the flux lines 210 in FIG. 5C is directly opposite the angular direction and orientation of the flux lines 210 in FIG. 5A.

The present invention has several advantages. The use of a central bore 92 extending through rotor 80 and the positioning of magnet 100 in rotor 80 adjacent to, and off-center from, the shaft 170 allows the end 172 of shaft 170 to extend fully through the bore 92 and rotor 80 and allows the sensor assembly 20 to be used in applications where the length of the shaft 170 must be accommodated by the sensor assembly.

Additionally, the mounting of the rotor 80 and magnet 100 in a housing section or cavity 32 separate from the electronic components (Hall effect sensor) cavity 42 allows for a more compact design and allows the electronic components in cavity 42 to be better isolated, protected, and sealed from outside environmental conditions. This allows the sensor assembly 20 to be used in more demanding applications with high heat and humidity.

Moreover, the use of the MLX90316 integrated circuit Hall Effect sensor reduces or eliminates the need for temperature compensation electronics since the MLX90316 device measures the direction of the magnetic field vectors in orthogonal axes and uses this information to compute position.

Still further, the semi-circular or moon shape of magnet 100 provides for the generation of a uniform flux field therethrough which, at all times, and irrespective of the angle or position of magnet 100 generates a field with a direction oriented and extending generally normally through the width and base surface 105 of magnet 100 so as to assure and provide uniform signal output linearity.

FIGS. 6-10 depict another embodiment of a rotary position sensor 300 in accordance with the present invention which comprises, among other elements, a housing 322, a rotor 380, a magnet 400, and a printed circuit board sensor assembly 420 as described in more detail below.

Figure 8:
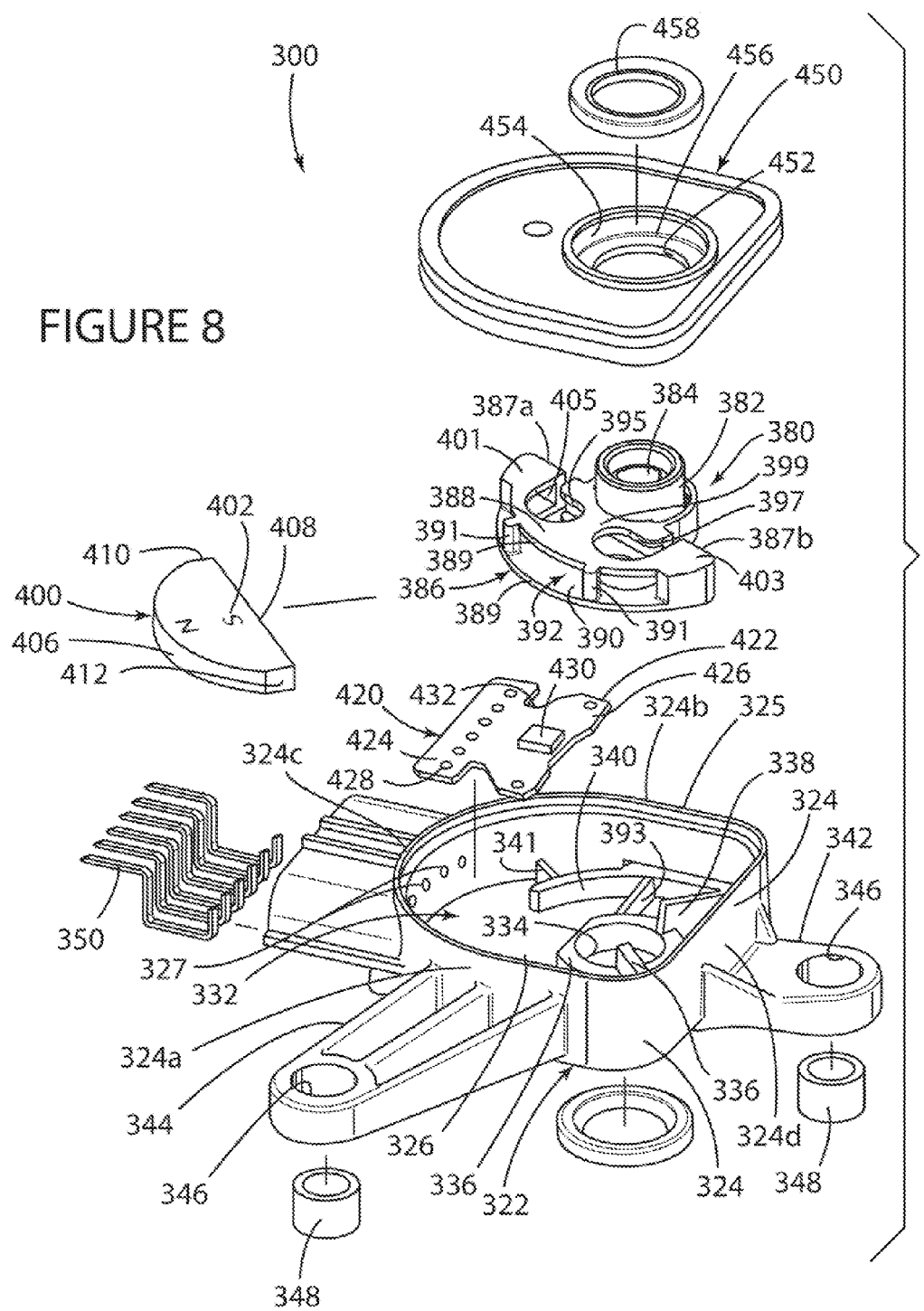
FIG. 8 is a simplified, exploded, perspective view of the rotary position sensor shown in FIGS. 6 and 7.

Housing 322 is generally semi-oval in shape, is made of plastic, and includes a peripheral circumferential vertical wall 324 including a pair of opposed, spaced-apart and generally parallel straight sections 324a and 324b, a curved section 324c joining the two straight sections 324a and 324b at one end thereof, and a straight section 324d opposite the curved section 324c and joining together the opposed ends of the two straight sections 324a and 324b. Housing 322 also includes a bottom surface or floor 326 which, in combination with the wall 324, defines an interior housing cavity 332. Housing wall 324 additionally defines a circumferential peripheral rim 325 (FIG. 8).

A circular aperture 334 (FIGS. 8 and 9) is defined in the floor 326 of housing 322 at a location adjacent and spaced from the housing wall section 324d. Aperture 334 is surrounded by a collar 336 which protrudes outwardly from the floor 326 into the cavity 332. A pair of spaced-apart posts or stops 336 and 338 protrude outwardly from the rim of the collar 336 and the interior surface of housing wall 324. A curved wall 340 protrudes outwardly from the floor 326 of housing 322 adjacent and spaced from the collar 336. A pair of straight walls 341 and 343 also protrude outwardly from the floor 326. Wall 341 extends between the interior of housing wall section 324C and the wall 341. Wall 343 extends between the wall 340 and collar 336.

An angled mounting flange or bracket 342 protrudes and extends outwardly from the outer surface of the wall section 324b of housing 322. An angled mounting flange or bracket 344 protrudes and extends outwardly from the outside surface of the wall portion 324a of housing 322. In the embodiment shown, bracket 344 is longer than bracket 342. Each of the brackets 342 and 344 defines a circular aperture or throughhole 346 which receives a circular closed insert 348. A fastener (not shown) is adapted to extend through each of the respective apertures 346 and associated inserts 348 for mounting and securing the rotary position sensor 300 to another structure.

A hollow connector portion or housing 348 extends and protrudes outwardly from the outside surface of the wall portion 324c of housing 322. A plurality of connector terminals 350 (FIGS. 8 and 9) extend through respective apertures 327 defined in the wall 324c of housing 322 and into the cavity 332 of housing 322.

The rotor 380 (FIGS. 6-10) includes an elongate, generally cylindrical central collar 382 defining an interior, generally cylindrical through-hole or aperture 384. A generally semi-circular or moon-shaped magnet housing 386 is coupled to, and extends outwardly from, a lower portion of the outside surface of the collar 382 in an off-center or off-axis or off-set relationship.

Magnet housing 386 includes a top horizontal surface 388 and a bottom horizontal surface 390 spaced from, and parallel to, the top surface 388 and together defining a housing 386 with open interior cavity 392 (FIG. 8) therebetween. The magnet housing 386 and, more specifically, each of the top and bottom surfaces 388 and 390 thereof, includes a peripheral elongate semi-circular outside edge 389 which is spaced from, and follows the curve and shape of, the central collar 382. A plurality of posts 391 extend between the edge 389 of top surface 388 and the edge 389 of bottom surface 390 in a spaced apart and generally parallel relationship.

The magnet housing 386 and, more specifically, each of the top and bottom surfaces 388 and 390 thereof, further defines a pair of diametrically opposed generally tear drop shaped slots 395 and 397 which define and separate the magnet housing 386 into a central base portion 399 which is coupled to, and extends outwardly from, the outside surface of the collar 382, and a pair of diametrically opposed peripheral curved elongate finger or wing portions 401 and 403 extending unitarily outwardly from opposed sides of the base 399 and defined in part by the outside edge 389 of respective top and bottom surfaces 388 and 390. Each of the fingers 401 and 403 curves in the direction of the collar 382 and, as a result of being separated from the base 399 by respective slots 395 and 397, is adapted to flex and bend either towards or away from, the base 399 in response to changes in temperature as described in more detail below. The fingers 401 and 403 terminate in respective vertical distal end walls 387*a* and 387*b* (FIG. 8) which together with the top and bottom housing surfaces 388 and 390 define a distal closed pocket 405 at the end of each of the fingers 401 and 403.

Magnet 400 (FIGS. 8 and 9) is generally semi-circularly- or moon-shaped, is made of the same material as the magnet 100, and includes top and bottom opposed, spaced-apart, and parallel surfaces 402 and 404; a first peripheral curved side surface 406 extending generally normally between the top and bottom surfaces 402 and 404 and defining the north pole of the magnet; a second peripheral straight side surface 408 opposed to the first curved side surface 406 and defining the south pole of the magnet; and third and fourth diametrically opposed straight peripheral side surfaces 410 and 412 extending between the ends of the curved side surface 406 and straight side surface 408.

Figure 9:
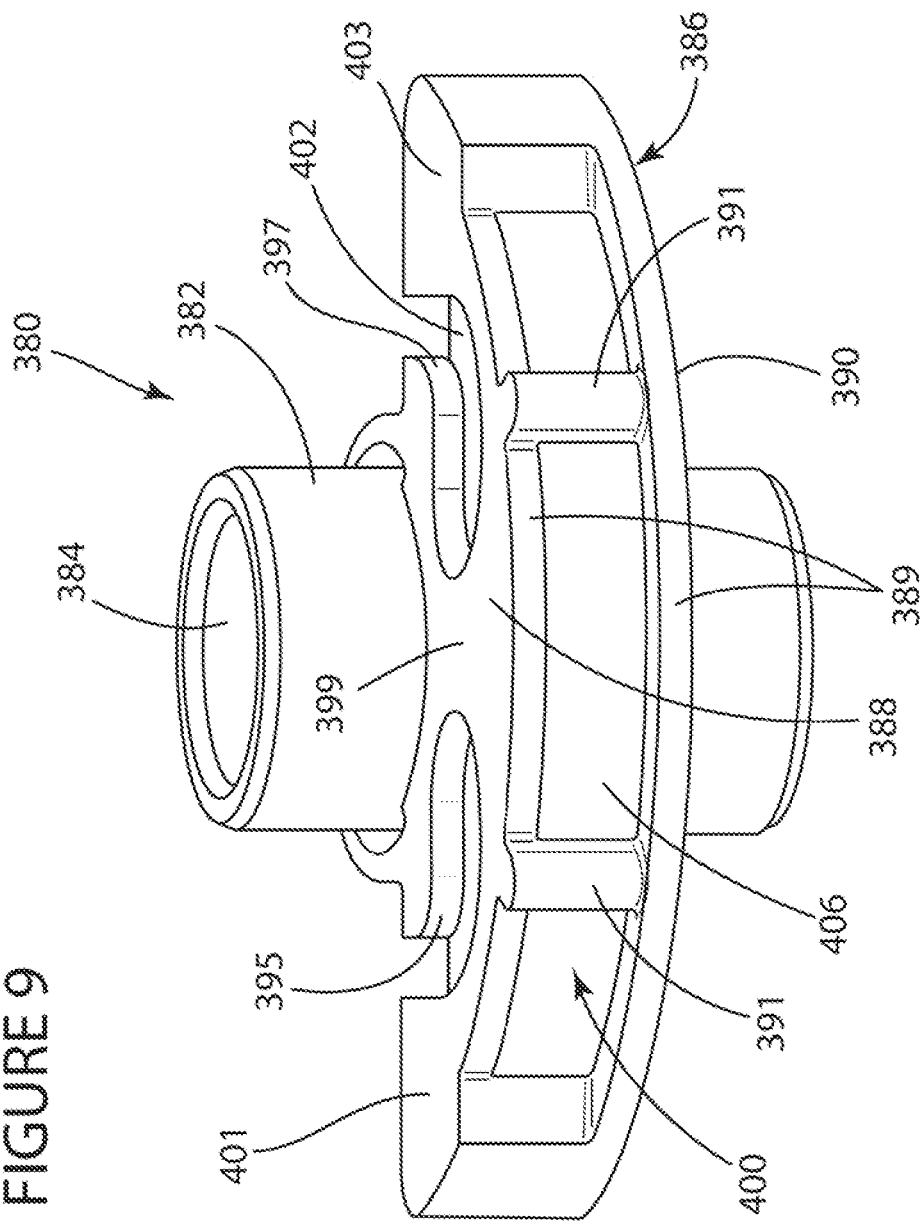
FIG. 9 is an enlarged, broken perspective view of the rotor and associated magnet housing with the magnet over-molded therein.

Magnet housing 386 is made of a plastic material which, as shown in FIG. 9, is over-molded around the magnet 400 in a relationship wherein the top surface 388 of magnet housing 386 and, more specifically, the top surface of the base 399 thereof, abuts the top surface 402 of magnet 400; the bottom surface 390 of magnet housing 386 and, more specifically, the bottom surface of the base 399 thereof, abuts the bottom surface 404 of magnet 400; the posts 391 of magnet housing 386 abut the outside face of the curved peripheral surface 406 of magnet 400; and the ends 410 and 412 of magnet 400 extend into, and are wrapped around, the respective pocket 405 defined at the distal end of each of the respective flexible fingers 401 and 403 of the magnet housing 386.

According to the invention, the shape and flexible construction and configuration of the magnet housing 386 prevents the plastic material comprising the magnet housing 386 from cracking or breaking when exposed to temperature variation. Specifically, it is understood that magnet materials typically have very small dimensional changes over temperature while plastics used for over-molding typically have larger (by comparison) dimensional changes over temperature. Thus, if the magnet 400 were over-molded with a full cover of plastic material and exposed to temperature extremes or to temperature cycling as required for automotive applications, the difference in dimensional changes, i.e., small for the magnet 400 and larger for the plastic material, could result in cracking or breakage of the plastic material and thus movement or shifting of the magnet 400 over-molded therein. Movement or shifting of the magnet 400 is undesirable of course since the position of magnet 400 is used to sense and measure the position of the shaft 170.

The curved shape of magnet housing 386 together with the incorporation therein of a base 399 and fingers 401 and 403 separated by respective slots 395 and 397, creates a magnet housing 386 where the fingers 401 and 403, in response to changes in temperature and resultant dimensional changes to both the magnet 400 and housing 386, are allowed to flex and bend independently of the base 399 to minimize stresses on the surfaces 388 and 390 of the magnet housing 386 which in turn eliminates the risk of cracking or breakage of the magnet housing 386 and thus eliminates the risk of movement or shifting of the magnet 400 over-molded therein.

Printed circuit board assembly 420 (FIGS. 8 and 10) includes a printed circuit board 422 having a generally rectangularly-shaped terminal or base section 424 and a top side sensor section 426 unitary therewith. Terminal section 424 defines a plurality of spaced-apart, co-linear plated terminal receptacles or through-holes 428 and sensor section 426 includes a sensor 430 seated and mounted on the top surface thereof. A slot 432 is defined in the board 422 between the terminal and sensor sections 424 and 426 respectively.

Although not shown or described in detail, it is understood that the printed circuit board assembly 420 is seated in the cavity 332 of housing 322 against the outer surface of the floor 326 of housing 322 in a relationship adjacent the collar 336 wherein the end of the terminal section 424 of the printed circuit board 422 is wedged between the housing walls 340 and 341, and the sensor section 426 of the printed circuit board 422 is wedged between the housing wall 340 and collar 336. The ends of respective terminals 350 are received in the respective terminal receptacles 428 defined in the board 422.

Figure 10:
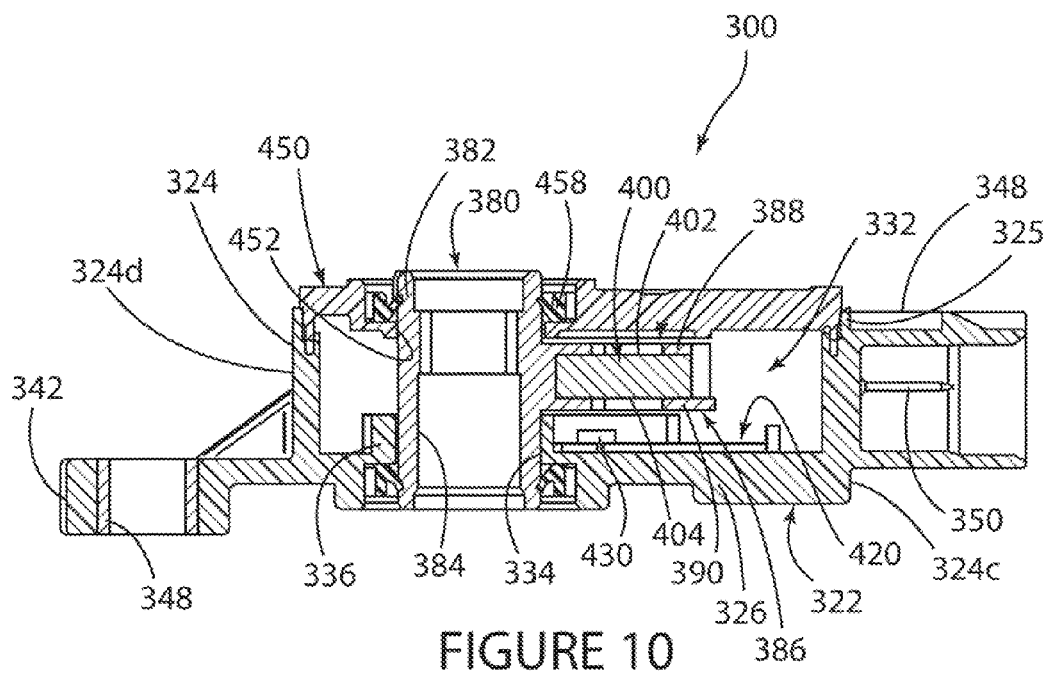
FIG. 10 is a simplified horizontal sectional view of the rotary position sensor taken along the line 10-10 in FIG. 6.

The rotor 380, in turn, and as shown in FIGS. 8 and 10, is seated in the cavity 332 of housing 322 in a relationship wherein the bottom of the collar 382 of rotor 380 is seated on top of the rim of the collar 336 defined in the cavity 332 and the bore 384 defined in the collar 336 in housing 322 is aligned with the bore 334 defined in the collar 382 of the rotor 380.

The lower surface 390 of magnet housing 386 on the rotor 380 is, in turn, seated adjacent the top rim portion of the wall 340 in housing cavity 332 in a relationship spaced and parallel to the floor 332 of housing 322 and in a relationship spaced from and overlying the sensor section 422 of board assembly 420 and, more specifically, in a relationship overlying and spaced from the sensor 430 mounted on top of the board assembly 420.

The end abutment surfaces or walls 387*a* and 387*b* at the end of each of the fingers 401 and 403 of magnet housing 386 are adapted to contact and abut against the stops 336 and 338 in housing cavity 332 to limit the rotation of rotor 380 and, more specifically, magnet housing 386 thereof, in housing cavity 332 to a total of ninety degrees.

A cover plate 450 (FIGS. 6, 8, and 10) is seated on the rim 325 of the wall 324 of housing 322 to cover and enclose the cavity 332 and, more specifically, the board assembly 420 and rotor 380 housed therein. The contour of plate 450 is generally semi-oval and follows the generally semi-oval shape of the housing 322. Plate 450 defines a generally circular aperture 452 and includes a generally circular vertical interior wall 454 surrounding and spaced from the aperture 452 and defining a recess 456 in the plate 450 surrounding the aperture 452.

Plate 450 is coupled to the housing 322 in a relationship wherein the top of the collar 382 of rotor 380 extends through the aperture 452 of plate 450 and into the recess 456. A seal ring 458 is seated in recess 456 between the collar 382 of rotor 380 and the Wall 454 of cover plate 450 to provide a seal between the plate 450 and the rotor 380.

Although not shown or described herein in any detail, it is understood that a shaft similar to the shaft 170 shown and described earlier with respect to rotary position sensor 20 is adapted to extend into the sensor assembly 300 and, more specifically, through the aperture 334 in the floor 326 of housing 322 and through the bore 384 in the collar 382 of the rotor 380.

Moreover, and although also not described in any detail, it is further understood that the sensor assembly 300 operates in substantially the same manner as the sensor 20 and provides the same advantages as described above with respect to the sensor assembly 20 and thus the earlier description of the operation and advantages of the sensor assembly 20 is incorporated herein by reference with respect to the sensor assembly 300.

Specifically, when shaft 170 is rotated, rotor 380 and magnet 400 are also rotated relative to the stationary sensor 430 which is spaced from and overlies the magnet 400. The magnetic field generated by the magnet 400 and, more specifically, at least the direction of the magnetic field thereof, is sensed by the sensor 430. More specifically, and as described above with respect to the sensor assembly 20, it is understood that the magnetic field can vary in magnitude/strength and in polarity/direction depending upon the position and location at which the magnet parameters (lines of flux) are measured.

Sensor 430 produces an electrical output signal that changes in response to the position of magnet 400. As the magnetic field (i.e., magnitude and polarity/direction) generated by the magnet 400 varies with rotation of the shaft 170 and rotor 480, the electrical output signal produced by sensor 430 changes accordingly, thus allowing the position of shaft 170 to be determined or ascertained. Sensor 430 senses the changing magnetic field (i.e., changing magnitude and polarity/direction) as magnet 400 is rotated.

Figures 11A, 11B, 11C:
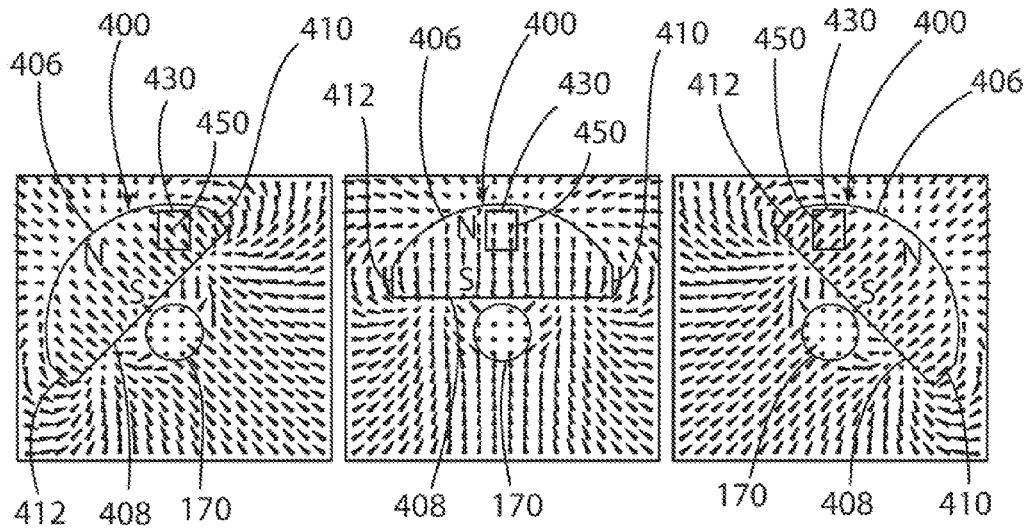
FIGS. 11A-11C are flux diagrams depicting the flux generated by the magnet of the rotary position sensor of FIGS. 6-10 at three different measurement angles/magnet positions.

FIGS. 11A-11C depict the location and orientation of the magnetic field/flux lines 450 in a horizontal plane above magnet 400 and passing over and through the magnetic flux sensor 430 at three different shaft and magnet rotation angles or positions, i.e., zero degrees (FIG. 11A), forty-five degrees (FIG. 11B), and ninety degrees (FIG. 11C).

More specifically, magnet 400 generates flux lines 450 that point and flow from the top, curved North Pole surface 406 of magnet 400 in the direction of and generally straight through the width and opposed bottom straight South Pole surface 408 of magnet 400 in a direction and orientation generally normal to the surface 408.

At the shaft and magnet rotation or position angle of zero degrees (FIG. 11A), the flux lines or vectors 450 have flux directions that point generally diagonally from the top left corner to the bottom right corner of magnetic flux sensor 430, i.e., flux lines or vectors oriented at a forty-five degree angle relative to each of the sensor side faces. Sensor 430 senses this direction of the magnetic field 210 and generates an electrical signal representative of this direction and thus the position of the magnet 400 and shaft 170.

At the shaft or magnet rotation or position angle of forty-five degrees (FIG. 11B), flux lines or vectors 450 have flux directions that point generally straight across from the top to the bottom of magnetic flux sensor 430, i.e., flux lines or vectors oriented in a relationship parallel to two of the sensor side surfaces and normal to the other two sensor side surfaces. Sensor 430 senses this direction of the magnetic field 210 and generates an electrical signal representative of this direction and thus the position of the magnet 400 and shaft 170.

At a shaft or magnet rotation or position angle of ninety degrees (FIG. 11C), flux lines or vectors 450 have flux directions that point generally diagonally from the top right corner to the bottom left corner of magnetic flux sensor 430, i.e., flux lines or vectors oriented at a forty-five degree angle relative to each of the sensor side surfaces. The angular direction and orientation of the flux lines 450 in FIG. 11C is directly opposite the angular direction and orientation of the flux lines 450 in FIG. 11A.

While the invention has been taught with specific reference to two embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A sensor assembly for sensing the position of a movable object, comprising:
   a housing defining first and second cavities;
   a wall separating the first and second cavities;
   a rotor in the first cavity, the rotor including a longitudinal axis and defining a bore and a pocket offset and spaced from the bore and the longitudinal axis of the rotor, the rotor being adapted for coupling with the movable object;
   a magnet in the pocket in the rotor, the magnet being adapted to generate a magnetic field; and
   a sensor in the second cavity, the sensor and the rotor being movable relative to each other and the sensor being adapted to sense the magnetic field and generate an electrical signal that is indicative of the position of the magnet and the position of the movable object.

2. The sensor assembly of claim 1, wherein a shaft extends into the housing and the bore of the rotor.

3. The sensor assembly of claim 1, wherein first and second plates cover the first and second cavities respectively.

4. The sensor assembly of claim 1, wherein the first and second cavities at least partially overlie each other and are accessible from opposite sides of the housing.

5. The sensor assembly of claim 1, wherein the magnetic field generated by the magnet has a flux direction normal with at least one of the side surfaces of the magnet.

6. The sensor assembly of claim 5, wherein the magnet includes at least a first curved side surface and at least a second straight side surface opposed to the first curved side surface, the flux direction being normal to the second straight side surface.

7. The sensor assembly of claim 6, wherein the magnet is generally semi circular in shape.

8. A sensor assembly for sensing the position of a movable object, comprising:
   a housing defining an interior cavity and including a wall defining an aperture;
   a sensor in the cavity;

a rotor in the cavity, the rotor including a collar and a pocket, the collar being aligned with the aperture in the wall of the housing and the pocket at least partially overlying the sensor;

a magnet in the pocket of the rotor, the magnet including at least a first straight side surface and the magnet generating a magnetic field extending through and in a direction generally normal to the first straight side surface of the magnet irrespective of the position of the magnet and the magnet at least partially overlying the sensor; and the magnet and the sensor being movable relative to each other and the sensor being adapted to sense the magnitude and direction of the magnetic field and generate an electrical signal in response to the magnetic field sensed by the sensor.

9. The sensor assembly of claim 8, further comprising a plate secured to the housing and covering the cavity, the plate defining an aperture in alignment with the collar of the rotor.

10. The sensor assembly of claim 8, wherein the housing defines an interior collar and the collar on the rotor abuts against and rotates relative to the collar in the housing.

11. The sensor assembly of claim 8, wherein the rotor includes a housing at least partially surrounding the collar and defining the pocket for the magnet, the housing defining at least one slot dividing the housing into first and second portions, the second portion being adapted to flex independently of the first portion in response to a change in temperature.

* * * * *